United States Patent
Fujisawa et al.

(10) Patent No.: US 9,349,371 B2
(45) Date of Patent: May 24, 2016

(54) SPEECH RECOGNITION TERMINAL DEVICE, SPEECH RECOGNITION SYSTEM, AND SPEECH RECOGNITION METHOD

(71) Applicant: DENSO CORPORATION, Kariya, Aichi-pref. (JP)

(72) Inventors: Yuki Fujisawa, Toyoake (JP); Toru Nada, Inazawa (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/595,379

(22) Filed: Jan. 13, 2015

(65) Prior Publication Data
US 2015/0206531 A1 Jul. 23, 2015

(30) Foreign Application Priority Data
Jan. 17, 2014 (JP) .................................. 2014-6845

(51) Int. Cl.
G10L 21/00 (2013.01)
G10L 25/00 (2013.01)
G10L 15/00 (2013.01)
G10L 15/22 (2006.01)
G10L 15/30 (2013.01)

(52) U.S. Cl.
CPC ........... *G10L 15/22* (2013.01); *G10L 15/30* (2013.01)

(58) Field of Classification Search
USPC ................................. 704/231–257, 270–275
See application file for complete search history.

(56) References Cited

U.S. PATENT DOCUMENTS

| | | | | |
|---|---|---|---|---|
| 5,930,751 A * | 7/1999 | Cohrs | ..................... | G10L 15/22 704/231 |
| 6,985,865 B1 * | 1/2006 | Packingham | ........... | G10L 15/22 704/270.1 |
| 8,340,975 B1 * | 12/2012 | Rosenberger | ........... | G10L 15/22 704/270 |
| 2002/0167392 A1 * | 11/2002 | Williams | ................ | H04L 51/24 340/3.3 |
| 2005/0179540 A1 * | 8/2005 | Rubenstein | ......... | B60R 16/0373 340/539.18 |
| 2006/0282268 A1 * | 12/2006 | Huang | .................... | G10L 15/26 704/275 |
| 2013/0253926 A1 | 9/2013 | Takahashi | | |
| 2014/0058732 A1 * | 2/2014 | Labsky | .................. | G10L 15/30 704/254 |

FOREIGN PATENT DOCUMENTS

JP 2012-256001 A 12/2012
JP 2014-191030 A 10/2014

OTHER PUBLICATIONS

U.S. Appl. No. 14/595,357, filed Jan. 13, 2015, Fujisawa et al.
Office Action issued Mar. 8, 2016 in the corresponding JP application No. 2014-006845 (with English translation).

* cited by examiner

*Primary Examiner* — Jesse Pullias
(74) *Attorney, Agent, or Firm* — Posz Law Group, PLC

(57) ABSTRACT

A speech recognition terminal device communicable with a speech recognition server includes a request device for requesting the speech recognition server to carry out the speech recognition of an acquired speech command, a prediction device for predicting a present delay time until a result of the requested speech recognition is obtained from the speech recognition server, a determination device for determining a filler word with a time length in accordance with the predicted present delay time, a filler speaking device for outputting the determined filler word during a waiting time until the result of the requested speech recognition is obtained from the speech recognition server, and a response device for responding to the user when the result of the speech recognition is acquired from the speech recognition server.

15 Claims, 4 Drawing Sheets

SPEECH RECOGNITION TERMINAL DEVICE, SPEECH RECOGNITION SYSTEM, AND SPEECH RECOGNITION METHOD

CROSS REFERENCE TO RELATED APPLICATION

The present application is based on Japanese Patent Application No. 2014-6845 filed on Jan. 17, 2014, disclosure of which is incorporated herein by reference.

TECHNICAL FIELD

The present disclosure relates to a speech recognition terminal device, a speech recognition system, and a speech recognition method for performing speech recognition of a user's speech by communicating with a remote server.

BACKGROUND

Server type speech recognition technology utilizing so-called cloud computing is already known (for example, refer to JP-A-2012-256001). This kind of server type speech recognition technology is such that a user's speech command input into a terminal device is analyzed by a remote speech recognition server, and the terminal device carries out a reply operation in accordance with an analysis result received from the speech recognition server.

In JP-A-2012-256001, when a speech recognition device requests a speech recognition server to analyze a speech command, the speech recognition device cancel waiting for receipt of the analysis result when determining that the communication status within the wait time is not good. In this case, this is notified to the user.

The inventors of the present application found out the following difficulty concerning a server type speech recognition technology.

In the existing server type speech recognition, a certain amount of time may be needed from when the user speaks a speech command to when the user receives a response. Causes of this include a delay time in the communication between the terminal device and the speech recognition server, processing time in the speech recognition server etc. When there is a time lag between the user speaking and the response, the user may feel uneasy due to not knowing whether or not the speech command has been received, and may repeat the speech command, even though communication with the speech recognition server, and the analysis process, are being carried out normally. Because of this, there is concern that the user will feel that usability is poor.

In the technology described in JP-A-2012-256001, no notification is made to the user unless the wait time elapses (time out) or it is determined that the communication status is not good, and until then, it is unknown to the user whether the speech command has been received.

SUMMARY

In view of the foregoing, it is an object of the present disclosure to provide a technology that allows a user to interactively understand that his or her spoken speech command has been received by a speech recognition system.

According to a first example, a speech recognition terminal device is capable of communicating with a speech recognition server that carries out speech recognition. The speech recognition terminal device comprises a speech acquisition device, a request device, a prediction device, determination device, a filler speaking device and a response device.

The speech acquisition device acquires a speech command spoken by a user. The request device requests the speech recognition server to carry out the speech recognition of the speech command acquired by the speech acquisition device. The prediction device predicts a present delay time until a result of the speech recognition of the speech command requested from the request device is obtained from the speech recognition server. The determination device determines a filler word with a time length in accordance with the present delay time predicted by the prediction device.

The filler speaking device outputs the filler word determined by the determination device as speech information during awaiting time until the result of the speech recognition requested from the request device is obtained from the speech recognition server. When the result of the speech recognition is acquired from the speech recognition server, the response device executes a process of responding to the user based on the acquired result of the speech recognition.

According to the above speech recognition terminal device, a filler word of a time length in accordance with a predicted delay time can be spoken to the user during a waiting time from the user speaking a speech command until a speech recognition result is obtained from a remote server etc., which carries out a speech command recognition process. By so doing, the user can recognize that the speech command he or she has spoken has been received by the system. Because of this, even when there is something of a delay until obtaining the result of speech recognition for the speech command, the user's uneasiness due to not knowing whether or not the speech command has been received can be prevented, and the user's needlessly repeating the speech command can be prevented. Furthermore, by determining a filler word of a time length in accordance with the predicted delay time, the filler word of a length appropriate to the waiting time can be output.

According to a second example of the present disclosure, a speech recognition system comprises the above described speech recognition terminal device and a speech recognition server that is capable of communicating with the speech recognition terminal device. The speech recognition server includes a recognition device and a notification device. The recognition device receives a request from the speech recognition terminal device to carry out the speech recognition of a speech command and carries out the speech recognition of the requested speech command. The notification device notifies the speech recognition terminal device, which is a sender of the request, of the result of the speech recognition by the recognition device.

According to the above speech recognition system, the waiting time from the user speaking a speech command until a speech recognition result is obtained from the speech recognition server can be predicted, and a filler word for filling the waiting time can be spoken to the user. By so doing, the user can recognize that the speech command he or she has spoken has been received by the system, because of which the user can be prevented from becoming uneasy due to not knowing whether or not the speech command has been received, and from needlessly repeating the speech command.

According to a third example of the present disclosure, a speech recognition method in a computer system that carries out speech recognition comprises performing an acquisition process, a request process, a prediction process, a determination process, a filler speaking process, and a response process. The acquisition process includes acquiring a speech command spoken by a user. The request process includes requesting a speech recognition server that carries out speech recognition of the speech command acquired in the acquisition process. The prediction process includes predicting a present delay time until a result of the speech recognition requested in the request process is obtained from the speech recognition server. The determination process includes determining a filler word with a time length in accordance with the present delay time predicted in the prediction process. The filler speaking process includes outputting the filler word, which is determined in the determination process, as speech information during a waiting time until the result of the speech recognition requested in the request process is obtained from the speech recognition server. The response process includes responding to the user based on the acquired result of the speech recognition when the result of the speech recognition is acquired from the speech recognition server.

According to this speech recognition method, the same advantages as those described in connection with the above speech recognition terminal device are obtained.

DETAILED DESCRIPTION

Embodiments of the present disclosure will be described based on the drawings. Embodiments are not limited to the following embodiments and be can be implemented in various forms.

(Speech Recognition System Configuration)

Figure 1:
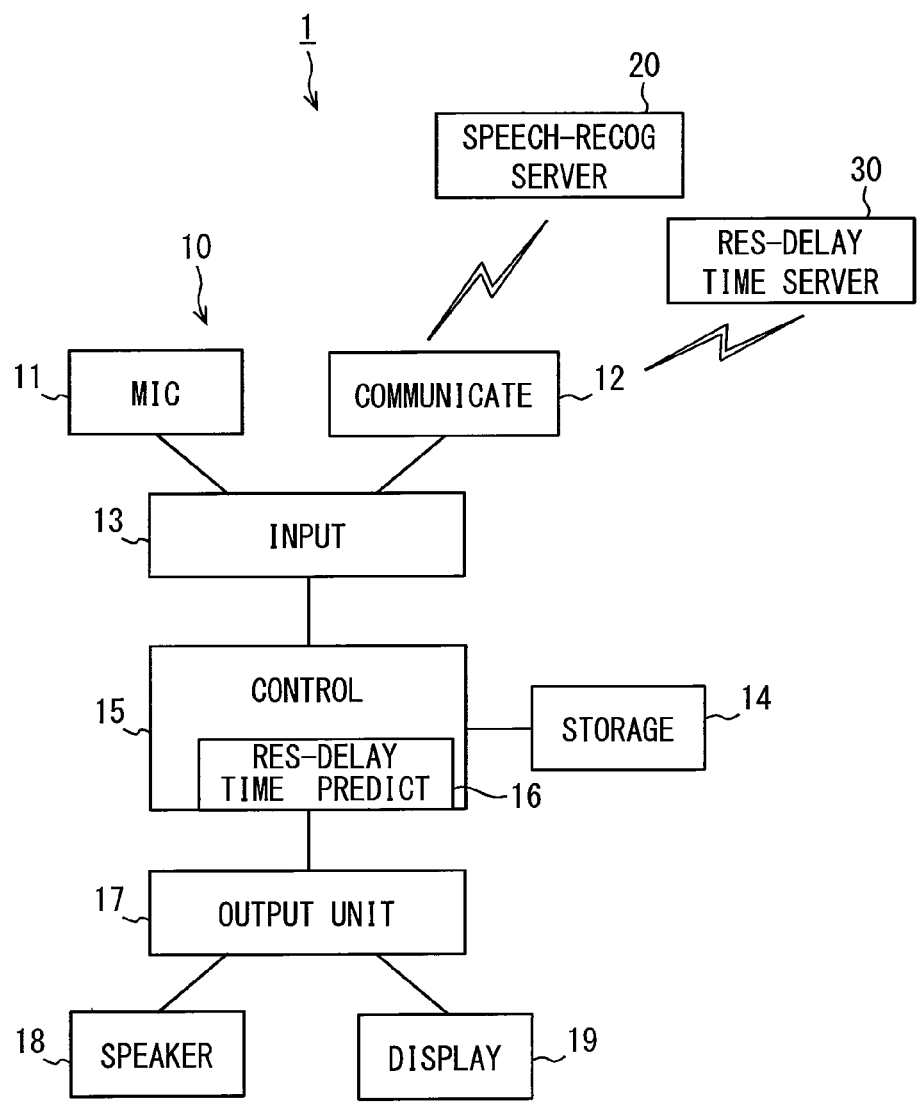
FIG. 1 is a block diagram illustrating a configuration of a speech recognition system.

As shown in FIG. 1, a speech recognition system 1 includes a speech recognition terminal device 10, a remote speech recognition server 20, and a response delay time server 30. The remote speech recognition server 20 and the response delay time server 30 can communicate with the speech recognition terminal device 10. The speech recognition terminal device 10 is realized as, for example, a vehicle mounted system such as a vehicle mounted navigation device including a speech recognition function. Alternatively, not being limited to a vehicle mounted system, the speech recognition terminal device 10 may be mounted in a portable terminal device such as a so-called smartphone.

The speech recognition terminal device 10 includes a microphone 11, a communication device 12, an input device 13, a storage device 14, a control device 15, an output device 17, a speaker 18, and a display 19. The microphone 11 is an input device for inputting a speech command spoken by a user. The communication device 12 is a communication device that carries out an exchange of data with the remote speech recognition server 20 and the response delay time server 30 via a predetermined communication path. The input device 13 is an input interface for inputting data into the control device 15. The input device 13 inputs a speech command input via the microphone 11 into the control device 15, and transmits the speech command to the speech recognition server 20 via the communication device 12. The input device 13 converts an input speech command into, for example, compressed speech data of a predetermined file format, and transmits the compressed speech data to the speech recognition server 20. The input device 13 receives a response message expressing the result of information processing, which is carried out in the speech recognition server 20 based on the transmitted speech command. The input device 13 inputs the received response message into the control device 15.

The storage device 14 is a storage device that stores various kinds of information. For example, a program executed by the control device 15, and data used when the program is executed, are stored in the storage device 14. Also, the storage device 14 stores a dictionary. The dictionary pre-stores data expressing filler words, which may be spoken during the waiting time until a response message is received from the speech recognition server 20. A plurality of different kinds of filler words, which are different in a time length taken to speech and which may be ready-made, are registered in the dictionary of filler words along with the time length taken to speech each filler words.

The control device 15 is an information processing device (for example, a microcomputer) including a CPU, ROM, RAM, and the like. The control device 15 controls an operation of the speech recognition terminal device 10 by executing a program. A response delay time prediction device 16 may be a functional configuration that predicts the waiting time needed from receipt of the input of a speech command from the user to receipt of a message of response to the speech command from the speech recognition server 20. Hereafter, this waiting time is called the response delay time. A specific method of predicting the response delay time will be described later. The output device 17 is an output interface that outputs a speech from the speaker 18, and causes an image to be displayed on the display 19, in accordance with a control by the control device 15.

The speech recognition server 20 is a server that provides a speech recognition service, and may be realized by, for example, a server device constructed on a computer network such as the Internet. The speech recognition server 20 receives speech command data from the speech recognition terminal device 10, and analyzes the contents of the speech command using speech recognition. Then, the speech recognition server 20 generates a response message expressing the result of information processing based on the analyzed speech command contents, and transmits the response message to the speech recognition terminal device 10, which is the source (sender) of the speech command. Service may include the followings, for example. The speech recognition server 20 sends a response message expressing a reply to a question from the user The speech recognition server 20 searches for useful information by using a Web service, or the like based on a key word included in the speech command and sends a response message expressing the search result. Alternatively, the speech recognition server 20 may send a text message expressing the contents of the analyzed speech command, or a control command that can be executed by the speech recognition terminal device 10.

The response delay time server 30 is a server that, for example, accumulates information expressing the response delay time in the speech recognition between each speech recognition terminal device 10 mounted in a vehicle and the speech recognition server 20, and provides the information to each speech recognition terminal device 10. That is, the information expressing the response delay times in multiple vehicles equipped with the speech recognition terminal devices 10 are accumulated. The response delay time server

30 is realized by, for example, a server device constructed on a computer network such as the Internet. The response delay time server 30 stores response delay time information gathered from the speech recognition terminal device 10 mounted in each vehicle, in association with a location, a time, and the like where the communication for the speech recognition is carried out.

The control device 15 of the speech recognition terminal device 10 executes an output process based on the response message received from the speech recognition server 20. For example, the control device 15 reads aloud the information contained in the response message received, or displays the information as an image. Alternatively, the control device 15 may operate an instrument such as vehicle mounted equipment in accordance with the contents of the response message.

(Speech Command Process in Speech Recognition System)

Figure 2:
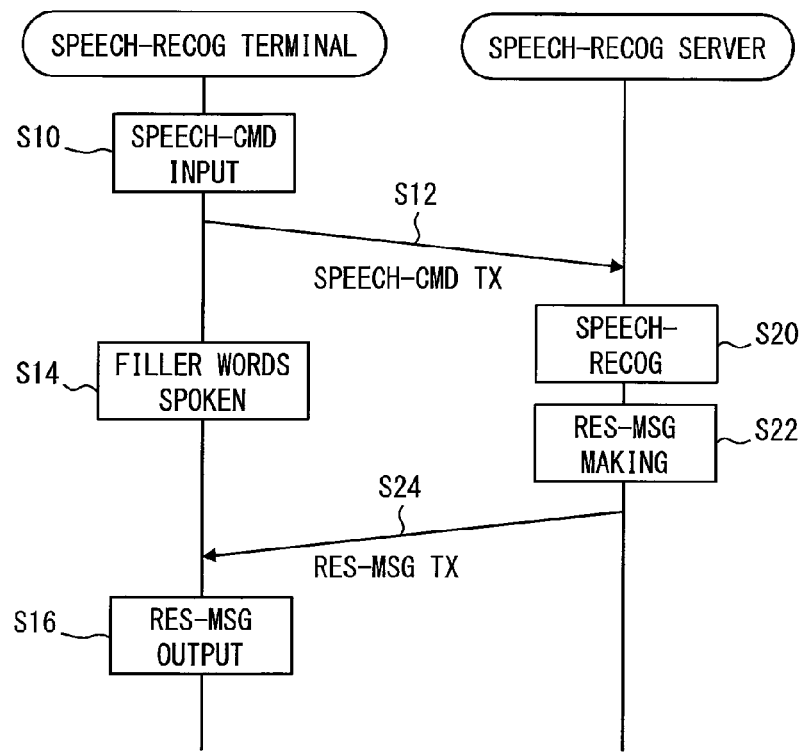
FIG. 2 is a sequence diagram illustrating a process procedure in the speech recognition system.

A procedure of a speech command process executed in the speech recognition system 1 will be described based on the sequence diagram of FIG. 2.

First, the speech recognition terminal device 10 receives an input of a speech command from a user (S10), and transmits data on the input speech command to the speech recognition server 20 (S12). The speech recognition server 20 carries out a speech recognition process in response to receipt of the speech command data from the speech recognition terminal device 10, and analyzes the contents of the speech command (S20). Then, the speech recognition server 20 generates a response message in accordance with the analyzed speech command contents (S22). The speech recognition server 20 transmits the generated response message to the speech recognition terminal device 10 (S24).

A certain response delay time occurs between when the speech command is inputted by the user and when the response message is acquired from the speech recognition server 20. The response delay time is caused by the time of a delay in communication between the speech recognition terminal device 10 and the speech recognition server 20, time needed for processing in the speech recognition server 20, and the like. Therefore, the speech recognition terminal device 10 says a filler word to fill the response delay time (S14). Then, upon receipt of the response message from the speech recognition server 20, the speech recognition terminal device 10 executes an output process, such as a speech output or display output, based on the received response message (S16).

Figure 3:
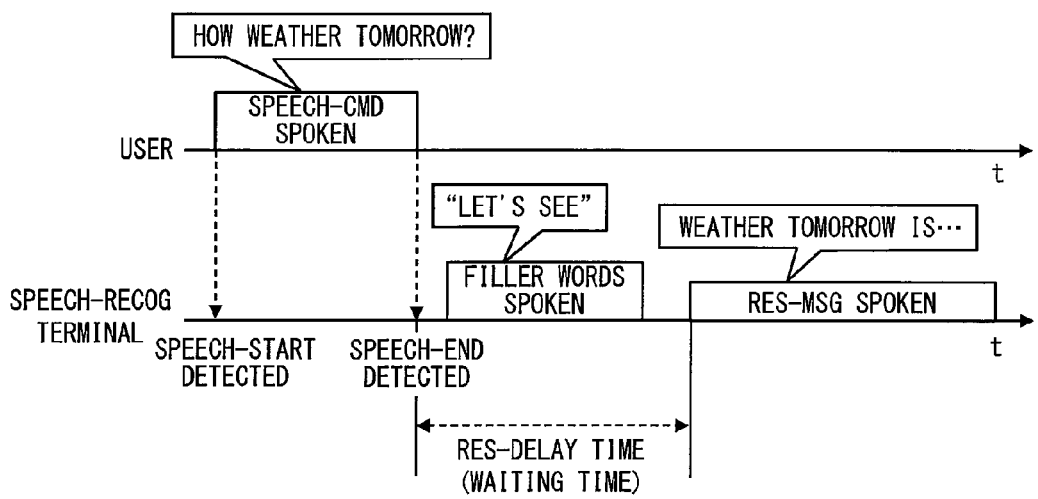
FIG. 3 is a timing chart illustrating timings of speaking filler words.

Based on the timing chart of FIG. 3, explanation will be given on the timing at which the speech recognition terminal device 10 says a filler word during the later-described speech command process. Now, suppose that the user speaks a speech command with the contents "How's the weather tomorrow?" The speech recognition terminal device 10, on detecting the end of the speech command, predicts the response delay time that will occur until receiving a response message to the speech command. Then, the speech recognition terminal device 10 determines the contents of filler word of a time length in accordance with the predicted response delay time, and says filler word(s) with the determined contents during the response delay time. In the example of FIG. 3, the filler words "Let's see", which are of a time length such that they can be spoken within the response delay time, are vocally output from the speaker 18.

Subsequently, when the response message to the user's speech command is obtained from the speech recognition server 20, the contents of the response message are vocally output from the speaker 18. In the example in FIG. 3, a response message with the contents "The weather tomorrow is . . . " is output as a reply to the speech command that asked about the next day's weather.

When a response message is received from the speech recognition server 20 while the filler word is being spoken, the response message may be output after waiting to complete the speaking of the filler word, or the speaking of the filler word may be interrupted at that point, and the response message output immediately.

(Filler Speaking Process)

Figure 4:
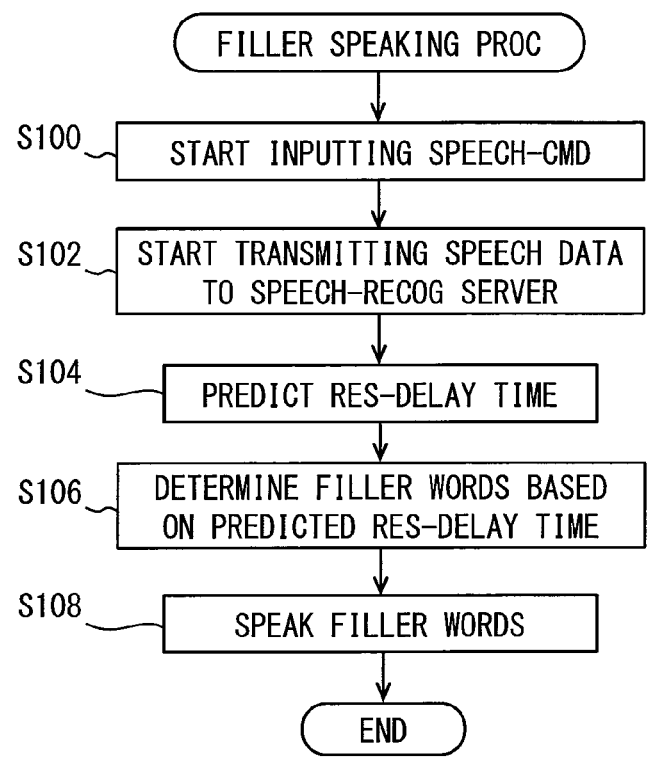
FIG. 4 is a flowchart illustrating a filler speaking process.

With reference to the flowchart of FIG. 4, explanation will be given on a procedure of a "Filler Speaking Process" executed by the control device 15 of the speech recognition terminal device 10. This process is executed when the start of a speech command from a user is detected.

In S100, the control device 15 starts the input of a speech command via the microphone 11. In S102, the control device 15 starts the transmission of the speech command to the speech recognition server 20 in conjunction with the input of the speech command via the microphone 11. In the above, the input speech command is converted into compressed speech data of a predetermined file format, and transmitted to the speech recognition server 20. In the S104, the control device 15 predicts the response delay time to be taken for speech recognition on this occasion. Specifically, the control device 15 predicts the response delay time using the following methods 1 to 3 or the like.

1. Actual response delay times needed when the speech recognition server 20 was asked for the speech recognition in the past are stored in advance, and the response delay time on this occasion is predicted based on the past response delay times. In this case, for example, the past response delay time nearest to the present time point is taken as the predicted value of the response delay time on this occasion. Alternatively, the average value of a plurality of past response delay times in a period immediately prior to the present time point may be taken as the predicted value of the response delay time on this occasion. Also, past response delay times may be stored in association with the information on positions from which communication is carried out with the speech recognition server 20. A response delay time in a predetermined geographical range in the immediate vicinity of the present location may be taken as the predicted value of the response delay time on this occasion.

2. Test communication of transmitting dummy data to the speech recognition server 20 and receiving a response message responding to the dummy data is carried out regularly, and the response delay time taken during the test communication is stored in advance. Then, the response delay time on this occasion is predicted based on the response delay times obtained from the test communication. In this case, for example, the response delay time from the past test communication nearest to the present time point is taken as the predicted value of the response delay time on this occasion. Alternatively, the average value of the response delay times from a plurality of test communications in a period immediately prior to the present time point may be taken as the predicted value of the response delay time on this occasion. Also, the positions from which the test communications are carried out may be stored in association with the response delay times, and a response delay time in a predetermined geographical range in the immediate vicinity of the present location may be taken as the predicted value of the response delay time on this occasion.

3. Information expressing actual response delay times needed to carry out the speech recognition between a plurality of speech recognition terminal devices 10 and the speech recognition server 20 is acquired from the response delay time server 30 via the communication device 12, and stored in advance in the storage device 14. Then, the response delay time on this occasion is predicted based on the response delay time information acquired from the response delay time server 30. Information on places, times, and the like, at which communication pertaining to speech recognition is carried out is contained in the response delay time information provided by the response delay time server 30. In this case, for example, a past response delay time in a predetermined geographical range in the immediate vicinity of the present location is taken as the predicted value of the response delay time on this occasion. Also, the value of the response delay time on this occasion may be predicted by preferentially employing, from among the plurality of response delay times received from the response delay time server 30, response delay times measured during a period near the present time point.

In S104, one of the multiple prediction methods described in 1 to 3 above may be used, or the plurality of prediction methods may be used in combination. When using the plurality of prediction methods, the worst value, that is, the longest predicted time, is employed as the response delay time on this occasion. Alternatively, the average value of the plurality of predicted times may be employed as the response delay time on this occasion.

In the S106, the control device 15 determines a filler word of a time length in accordance with the length of the response delay time predicted in S104. Specifically, from the dictionary of pre-generated filler words stored in the storage device 14, the control device 15 selects such a filler word of a time length that they can be spoken within the range of the predicted response delay time device. As an example, the configuration may be such that the control device 15 randomly selects a filler word from among a plurality of kinds of filler word recorded in advance in the dictionary, those being "Let's see", "Just a moment", and the like. At this time, the configuration may be such that a filler word differing from the filler words used on the previous occasion are selected, so that filler words the same as the filler words used on the previous occasion is not used on consecutive occasions. Also, a filler word of a time length matching the predicted response delay time may be generated by linking a plurality of filler words together, or by repeating the same filler words. In S108, the control device 15 vocally outputs the filler word determined in S106 from the speaker 18. After S108, the control device 15 finishes the process.

(Response Output Process)

With reference to the flowchart of FIG. 5, explanation will be given on a procedure of a "Response Output Process" executed by the control device 15 of the speech recognition terminal device 10. This process is executed when a speech command is transmitted to the speech recognition server 20. This process may be executed by a CPU of the control device 15 in accordance with a program stored in a storage device.

In S200, the control device 15 determines whether or not a response message responding to the speech command transmitted in S102 of the filler speaking process (refer to FIG. 4) has been received from the speech recognition server 20. If a response message has been received (YES in S200), the control device 15 proceeds to S210. Meanwhile, if no response message has been received (NO in S200), the control device 15 proceeds to S202.

In S202, the control device 15 determines whether or not the response delay time previously predicted in either S104 of the filler speaking process (refer to FIG. 4) or below-described S204 has elapsed. If the response delay time has not elapsed (NO in S202), the control device 15 returns to S200.

Meanwhile, if the response delay time has elapsed (YES in S202), the control device 15 proceeds to S204. In S204, the control device 15 determines a response delay time extension. Specifically, the control device 15 determines the response delay time extension using the following methods 1 and 2 or the like.

1. When the response delay time is predicted using a single method, or when the worst value among response delay times predicted using a plurality of methods is employed as the response delay time in the filler speaking process S104 (refer to FIG. 4), a time specified in advance is determined as the response delay time extension.

2. When the average value of the results of predicting the response delay time using a plurality of methods is employed as the response delay time, the difference between the worst value and the average value is determined as the response delay time extension. However, when the difference between the worst value and average value is equal to or less than a predetermined threshold value, the filler word of the extension is not spoken. With regard to the response delay time extension from the second time onward, a time specified in advance is determined as the response delay time extension.

In the S206, the control device 15 determines a filler word of a time length in accordance with the length of the response delay time extension determined in S204. Herein, the filler word is determined using the same method as in the filler speaking process S106 (refer to FIG. 4). Then, in S208, the control device 15 vocally outputs the filler word determined in S206 from the speaker 18. After S208, the control device 15 returns to S200.

Figure 6:
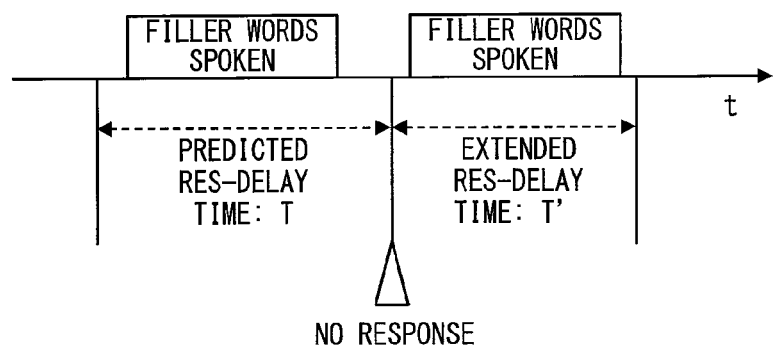
FIG. 6 is a timing chart illustrating timings of speaking filler words in an extension time.

FIG. 6 is a timing chart for cases where a filler word is spoken during the response delay time extension. When no response message has been received from the speech recognition server 20 at the time point when a response delay time T predicted on the previous occasion elapses, the speech recognition terminal device 10 determines an extended response delay time T'. Then, the control device 15 determines such a filler word of a time length that they will fit inside the response delay time T', and speaks the filler word with the determined contents during the response delay time T'.

Figure 5:
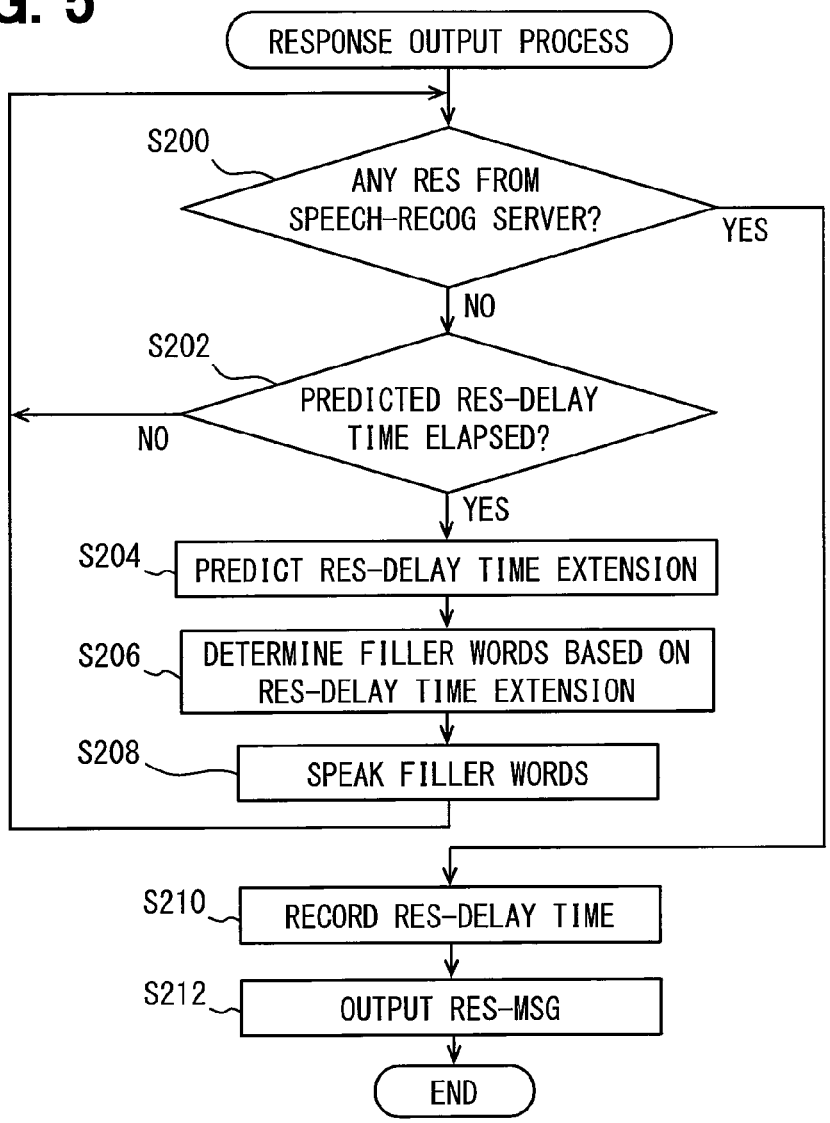
FIG. 5 is a flowchart illustrating a response output process.

Explanation returns to the flowchart of FIG. 5. When it is determined in S200 that a response message has been received from the speech recognition server 20, the process proceeds to S210. In S210, the actual response delay time taken from the receipt of the input of a speech command to the recipe of a response message is recorded. With regard to the place storing the response delay time history, the history may be stored in the storage device 14 of the speech recognition terminal device 10, or may be stored in the response delay time server 30. Also, the response delay time history may be stored in association with the information on the position and time at which communication with the speech recognition server 20 is carried out. The position at which communication with the speech recognition server 20 is carried out may be identified utilizing a GPS receiver (not shown), or the like, installed in a vehicle or the like.

In S212, the control device 15 executes an output process based on the response message received from the speech recognition server 20. Herein, the control device 15 reads aloud the contents of the response message received, displays the contents as an image, or operates an instrument such as vehicle mounted equipment in accordance with the contents of the response message. After S212, the control device 15 finishes the process.

(Modifications)

In the above embodiment, the speech recognition server 20 is realized by a remote server, or the like, constructed on the Internet. Alternatively, the speech recognition terminal device 10 and the speech recognition server 20 may be connected to a local area network (LAN).

(Advantages)

The speech recognition system 1 of the embodiment can provide the following advantages for example.

A filler word of a time length in accordance with a predicted response delay time can be spoken to the user during a waiting time from when a speech command is spoken by a user to when a response message responsive to the speech command is obtained from the speech recognition server 20. Because of this, the user can recognize that the his or her spoken speech command has been received by the system. Thus, even when there is something of a delay until obtaining a response message responsive to the speech command, the user's uneasiness due to not knowing whether or not the speech command has been received can be minimized. Additionally, the user's needlessly repeating the speech command is prevented. Additionally, by determining a filler word of a time length in accordance with the predicted response delay time, it becomes possible to output the filler word of a length appropriate to the waiting time.

Moreover, the speech recognition terminal device 10 can predict the response delay time based on a history of actual response delay times when carrying out speech recognition or test communication with the speech recognition server 20. Also, the speech recognition terminal device 10 can predict the response delay time based on a history of actual response delay times when the speech recognition terminal device 10 mounted in another vehicle has carried out speech recognition with the speech recognition server 20 in the past. Also, when utilizing a history of past response delay times, the response delay time can be predicted taking into consideration the period and geographical range in which the communication has been carried out. Therefore, the response delay time can be predicted with high accuracy, and filler words of an appropriate length can be output.

What is claimed is:

1. A speech recognition terminal device capable of communicating with a speech recognition server that carries out speech recognition, the speech recognition terminal device comprising:
    a speech acquisition device that acquires a speech command spoken by a user;
    a request device that requests the speech recognition server to carry out the speech recognition of the speech command acquired by the speech acquisition device;
    a prediction device that predicts a present delay time until a result of the speech recognition of the speech command requested from the request device is obtained from the speech recognition server;
    a determination device that determines a filler word with a time length in accordance with the present delay time predicted by the prediction device;
    a filler speaking device that outputs the filler word determined by the determination device as speech information during a waiting time until the result of the speech recognition requested from the request device is obtained from the speech recognition server;
    a response device that, when the result of the speech recognition is acquired from the speech recognition server, executes a process of responding to the user based on the acquired result of the speech recognition; and
    an acquiring device that acquires time information expressing past delay times when the communication has been carried out with the speech recognition server in past, wherein
    based on the past delay times expressed by the time information acquired by the acquisition device, the prediction device predicts the present delay time until the result of the speech recognition requested from the request device is obtained from the speech recognition server.

2. The speech recognition terminal device according to claim 1, wherein:
    the acquiring device acquires time information expressing the present delay time when the speech recognition is requested of the speech recognition server by the request device and the result of the speech recognition pertaining to the request is obtained from the speech recognition server.

3. The speech recognition terminal device according to claim 1, wherein:
    the acquisition device acquires time information expressing a test delay time measured by test communication with the speech recognition server.

4. The speech recognition terminal device according to claim 1, wherein:
    the time information acquired by the acquiring device is association with a time of the communication, and
    based on the past delay times expressed by the time information associated with the communication carried out immediately prior to, or during a period near, a present time point, the prediction device predicts the present delay time until the result of the speech recognition is obtained from the speech recognition server.

5. The speech recognition terminal device according to claim 1, wherein:
    the time information acquired by the acquiring device is associated with a location where the communication is carried out; and
    based on the past delay times expressed by the time information associated with the communication carried out within a predetermined geographical range with respect to a present position, the prediction device predicts the present delay time until the result of the speech recognition is obtained from the speech recognition server.

6. A speech recognition system comprising:
    the speech recognition terminal device according to claim 1; and
    a speech recognition server that is capable of communicating with the speech recognition terminal device,
    wherein
    the speech recognition server includes:
    a recognition device that receives a request from the speech recognition terminal device to carry out the speech recognition of a speech command and carries out the speech recognition of the requested speech command; and
    a notification device that notifies the speech recognition terminal device, which is a sender of the request, of the result of the speech recognition by the recognition device.

7. A speech recognition terminal device capable of communicating with a speech recognition server that carries out speech recognition, the speech recognition terminal device comprising:
    a speech acquisition device that acquires a speech command spoken by a user;
    a request device that requests the speech recognition server to carry out the speech recognition of the speech command acquired by the speech acquisition device;

a prediction device that predicts a present delay time until a result of the speech recognition of the speech command requested from the request device is obtained from the speech recognition server;

a determination device that determines a filler word with a time length in accordance with the present delay time predicted by the prediction device;

a filler speaking device that outputs the filler word determined by the determination device as speech information during a waiting time until the result of the speech recognition requested from the request device is obtained from the speech recognition server;

a response device that, when the result of the speech recognition is acquired from the speech recognition server, executes a process of responding to the user based on the acquired result of the speech recognition; and an acquiring device that acquires from an external device time information expressing past delay times when the speech recognition server has communicated with the speech recognition terminal device in past, wherein based on the past delay times expressed by the time information acquired from the external device by the acquiring device, the prediction device predicts the present delay time until the result of the speech recognition is obtained from the speech recognition server.

8. A speech recognition terminal device capable of communicating with a speech recognition server that carries out speech recognition, the speech recognition terminal device comprising:

a speech acquisition device that acquires a speech command spoken by a user;

a request device that requests the speech recognition server to carry out the speech recognition of the speech command acquired by the speech acquisition device;

a prediction device that predicts a present delay time until a result of the speech recognition of the speech command requested from the request device is obtained from the speech recognition server;

a determination device that determines a filler word with a time length in accordance with the present delay time predicted by the prediction device;

a filler speaking device that outputs the filler word determined by the determination device as speech information during a waiting time until the result of the speech recognition requested from the request device is obtained from the speech recognition server;

a response device that, when the result of the speech recognition is acquired from the speech recognition server, executes a process of responding to the user based on the acquired result of the speech recognition;

an extension prediction device that, in cases where the result of the speech recognition is not acquired from the speech recognition server at a time when the present delay time predicted by the prediction device elapses, predicts an extension time when the result of the speech recognition will be obtained;

an extension determination device that determines an extension filler word with a time length in accordance with the extension time predicted by the extension prediction device; and an extension filler speaking device that outputs the extension filler word determined by the extension determination device as speech information during the waiting time until the result of the speech recognition is obtained from the speech recognition server.

9. A speech recognition method in a computer system that carries out speech recognition, the speech recognition method comprising:

performing an acquisition process including acquiring a speech command spoken by a user;

performing a request process including requesting a speech recognition server that carries out speech recognition of the speech command acquired in the acquisition process;

performing a prediction process including predicting a present delay time until a result of the speech recognition requested in the request process is obtained from the speech recognition server;

performing a determination process including determining a filler word with a time length in accordance with the present delay time predicted in the prediction process;

performing a filler speaking process including outputting the filler word, which is determined in the determination process, as speech information during a waiting time until the result of the speech recognition requested in the request process is obtained from the speech recognition server;

when the result of the speech recognition is acquired from the speech recognition server, performing a response process including responding to the user based on the acquired result of the speech recognition; and performing an acquiring process including acquiring time information expressing past delay times when communication has been carried out with the speech recognition server in past, wherein:

in the prediction process, the present delay time until the result of the speech recognition is obtained from the speech recognition server is predicted based on the past delay times expressed by the time information acquired in the acquiring process.

10. The speech recognition method according to claim 9, wherein:

the acquiring process includes acquiring time information expressing the present delay time when the speech recognition is requested of the speech recognition server and the result of the requested speech recognition is obtained from the speech recognition server.

11. The speech recognition method according to claim 9, wherein:

the acquiring process includes acquiring time information expressing a test delay time measured by test communication with the speech recognition server.

12. The speech recognition method according to claim 9, wherein:

the time information is associated with a time of the communication; and in the prediction process, the present delay time until the result of the speech recognition is obtained from the speech recognition server is predicted based on the past delay times expressed by the time information associated with the communication carried out immediately prior to, or during a period near, a present time point.

13. The speech recognition method according to claim 9, wherein:

the time information is associated with a location where the communication is carried out; and in the prediction process, the present delay time until the result of the speech recognition is obtained from the speech recognition server is predicted based on the past delay times expressed by the time information associated with the communication carried out within a predetermined geographical range with respect to a present location.

14. A speech recognition method in a computer system that carries out speech recognition, the speech recognition method comprising:

performing an acquisition process including acquiring a speech command spoken by a user;

performing a request process including requesting a speech recognition server that carries out speech recognition of the speech command acquired in the acquisition process;

performing a prediction process including predicting a present delay time until a result of the speech recognition requested in the request process is obtained from the speech recognition server;

performing a determination process including determining a filler word with a time length in accordance with the present delay time predicted in the prediction process;

performing a filler speaking process including outputting the filler word, which is determined in the determination process, as speech information during a waiting time until the result of the speech recognition requested in the request process is obtained from the speech recognition server;

when the result of the speech recognition is acquired from the speech recognition server, performing a response process including responding to the user based on the acquired result of the speech recognition; and performing an acquiring process including acquiring time information stored in an external device as information expressing past delay times when the speech recognition server has communicated with a remote speech recognition terminal device in past, wherein:

in the prediction process, the present delay time until the result of the speech recognition is obtained from the speech recognition server is predicted based on the past delay times expressed by the time information acquired from the external device.

15. A speech recognition method in a computer system that carries out speech recognition, the speech recognition method comprising:

performing an acquisition process including acquiring a speech command spoken by a user;

performing a request process including requesting a speech recognition server that carries out speech recognition of the speech command acquired in the acquisition process;

performing a prediction process including predicting a present delay time until a result of the speech recognition requested in the request process is obtained from the speech recognition server;

performing a determination process including determining a filler word with a time length in accordance with the present delay time predicted in the prediction process;

performing a filler speaking process including outputting the filler word, which is determined in the determination process, as speech information during a waiting time until the result of the speech recognition requested in the request process is obtained from the speech recognition server;

when the result of the speech recognition is acquired from the speech recognition server, performing a response process including responding to the user based on the acquired result of the speech recognition;

performing an extension determination process including, when the result of the speech recognition is not acquired from the speech recognition server at a time when the predicted present delay time elapses, predicting an extension time when the result of the speech recognition will be obtained;

performing a determining process including determining an extension filler word with a time length in accordance with the extension time predicted in the extension determination process; and performing an extension filler speaking process including outputting the determined extension filler word as speech information during a waiting time until the result of the speech recognition is obtained from the speech recognition server.

* * * * *